United States Patent [19]

Stevens et al.

[11] Patent Number: 5,242,658
[45] Date of Patent: Sep. 7, 1993

[54] LEAD-FREE ALLOY CONTAINING TIN, ZINC AND INDIUM

[75] Inventors: Laurence G. Stevens; Charles E. T. White, both of Clinton, N.Y.

[73] Assignee: The Indium Corporation of America, Utica, N.Y.

[21] Appl. No.: 909,694

[22] Filed: Jul. 7, 1992

[51] Int. Cl.$^5$ ............................................. C22C 13/00
[52] U.S. Cl. .................................. 420/557; 219/146.22
[58] Field of Search .................... 420/557; 219/146.22

[56] References Cited

U.S. PATENT DOCUMENTS

| | | | |
|---|---|---|---|
| 448,161 | 3/1891 | Pabst . | |
| 1,437,641 | 12/1922 | Ferriere et al. . | |
| 1,721,814 | 7/1929 | Geisel . | |
| 2,157,933 | 8/1938 | Hensel et al. | 260/166 |
| 2,532,265 | 1/1950 | Zickrick | 200/124 |
| 2,623,273 | 5/1952 | Murray et al. | 29/180 |
| 2,649,368 | 10/1952 | Smith et al. | 75/135 |
| 2,717,840 | 2/1952 | Bosch | 117/70 |
| 2,957,788 | 10/1960 | Armstrong | 148/1.5 |
| 3,103,067 | 8/1963 | Dixon | 29/473.1 |
| 3,184,303 | 5/1965 | Grobin | 75/134 |
| 3,627,517 | 12/1971 | Ibscher | 75/134 |
| 3,831,263 | 8/1974 | Dzierski | 29/503 |
| 3,833,362 | 9/1974 | Postupack | 75/134 |
| 4,042,725 | 8/1977 | Nomaki et al. | 420/557 |
| 4,492,842 | 1/1985 | Koopman et al. | 219/85 M |
| 4,670,217 | 6/1987 | Henson et al. | 420/562 |
| 4,695,428 | 9/1987 | Ballentine et al. | 420/561 |
| 4,797,328 | 1/1989 | Boehm et al. | 420/557 |
| 4,834,794 | 5/1989 | Yagi et al. | 75/255 |
| 4,966,142 | 10/1990 | Zimmerman et al. | 228/263.12 |
| 5,061,035 | 10/1991 | Rogers | 385/115 |

FOREIGN PATENT DOCUMENTS 59-41430  3/1984  Japan ................................. 420/557

OTHER PUBLICATIONS

Rhines et al., "Constitution of the System Indium-Tin", pp. 1-20. Paper presented at the 28th Annual Convention of the American Societey for Metals (1946).
H. Spengler, "Beitrag zur Kenntnis der Zwei- und Mehrstoffsysteme der B-Metalle: Das guinare System Kadmium-Germanium-Indium-Zinn-Zink", Metall., vol. 8, p. 936 (1954). (Translation provided).
Ludwick, "Indium", pp. 21-151, The Indium Corporation of America (1959).
Manko, "Solder and Soldering", pp. 115-123, McGraw Hill Book Company (2nd ed. 1979).
Assembly Joining Handbook, "Low Melting Temperature Solders", The Institute For Interconnecting and Packaging Electronic Circuits (Dec. 1983).
The Indium Corporation of America, "Indalloy Fusible Alloys" (1988).
The Indium Corporation of America, "Indalloy Specialty Solders & Alloys" (1988).
Federal Specification, "Solder; Tin Alloy, Tin-Lead Alloy, and Lead Alloy", QQ-S-571E (Interim Amendment 5 (ER) 28 Dec., 1989).
Stevens and White, "Properties and Selection: Indium and Bismuth", The Metals Handbook, vol. 2 (10th ed. 1990).
"Soldering of Electronics Products", Lead Industries Association, Inc. (1991).

Primary Examiner—Deborah Yee

[57] ABSTRACT

A low melting point solder alloy comprising effective amounts of tin, zinc and indium.

28 Claims, No Drawings

LEAD-FREE ALLOY CONTAINING TIN, ZINC AND INDIUM

BACKGROUND OF THE INVENTION

The present invention relates to lead-free alloys for use in soldering. More particularly, the present invention relates to a lead-free solder composition comprising tin, zinc and indium.

Different solder compositions have unique characteristics which make them suitable for particular applications. Two characteristics of a solder which are important to its use are melting temperature and melting range.

The solder chosen for a particular use should have a low enough melting temperature that the melted solder does not damage any temperature-sensitive components that are to be joined. However, the melting temperature should also be high enough that the joint formed will not be affected by the operating temperature of the device or by subsequent soldering operations. In modern electronic applications, the temperature sensitivity of microelectronic components requires the use of solders at relatively low temperatures. In comparison, solders for joining and sealing pipes in plumbing operations are generally applied at much higher working temperatures because the components are not so temperature sensitive.

The melting range of a solder is also considered. Pure elemental metals have a single melting point. Most alloys, however, with the exception of eutectic compositions, melt over a range of temperatures. The alloy begins to melt at a temperature called the solidus but is not completely liquid until it reaches a higher temperature called the liquidus. The range between the solidus and the liquidus is referred to as the melting range or pasty range. At temperatures within the melting range, the alloy contains a mixture of solid and liquid phases containing different metal compositions. The solid phase contains higher melting point components and the liquid phase lower melting point components. Separation of the two components, called liquation, can alter the chemical composition of the alloy and the physical characteristics of the resulting joint.

Liquation can be particularly problematic in automated soldering operations in which components, such as circuit boards, are transported by conveyer belt through the soldering apparatus. After the solder has been applied by a process such as wave soldering, the conveyor carries the components into a cooling zone. As the soldered joints cool, the solder solidifies. If a solder with a large melting range is used, then parts of the soldered joint will begin to solidify while some of the solder remains liquid. Vibration from the conveyor belt will then tend to separate the solid and liquid phases. The vibration and liquation may disrupt the crystallization of the solder. The disrupted joint may be physically weakened and conduct electricity poorly or not at all resulting in a circuit which is prone to failure or completely non-functional. In such applications, it is preferable to use a eutectic solder or a solder with a small melting range.

Solders with small melting ranges are also important in certain "step-soldering" operations where components are added to a device sequentially. These operations are also dependent upon solders with specific melting temperatures. In step soldering, the first components are joined using a relatively high melting temperature solder. When later components are joined, a lower melting temperature solder is used so that the earlier-soldered joints are not affected by the soldering operation. Further components may then be added using solder with an even lower melting temperature. The availability of solders with different melting temperatures is critical to such step-soldering processes. It is also important, if several soldering steps are to be performed, for the melting ranges of the solders to be small.

Several solders are in common use in automated soldering operations. Sn63Pb37, comprising 63% tin and 37% lead, is a eutectic alloy which melts at 183° C. Sn62Pb36Ag02 comprising 62% tin, 2% silver and 36% lead is a eutectic alloy which melts at 179° C. These solders have good characteristics for automated soldering. However, they suffer from the disadvantage that they contain lead.

Lead is known to have toxic effects. For this reason, rigorous limitations have been imposed upon the use of lead and lead-containing compositions. These limitations upon the use of lead-containing solders are most stringent in connection with plumbing where, until recently, the most popular plumbing solder was Sn50Pb50 which comprises 50% lead and 50% tin. Recent federal legislation banned the use of lead-containing solders in potable water systems forcing plumbers to stop using Sn50Pb50 and turn to lead-free solders.

Although plumbing is the most vivid example, other uses of lead-containing solders are also regulated. The United States Occupational Safety and Health Administration ("OSHA") has established a complex and extensive lead standard which regulates the permissible lead concentration in the air in the work place. In situations that result in high levels of lead in the air, OSHA regulations have strict requirements for minimizing employee exposure. Although most situations in which lead-containing solders are used do not produce lead concentrations high enough to trigger the OSHA standards, it is possible that stricter limitations upon the use of lead in solder might be imposed. Even in the absence of such regulations, reducing employee exposure to lead is still desirable. It would, therefore, be desirable to reduce the dependence upon lead-containing solders for certain applications by providing lead-free alternative solders.

It would also be desirable to provide lead-free solder compositions with relatively low melting temperatures suitable for the assembly of electronic components.

It would further be desirable to provide lead-free solder compositions with relatively small melting ranges suitable for use in automated soldering operations.

It would also be desirable to provide lead-free solder compositions which can replace currently used lead-containing solders such as Sn63Pb37.

SUMMARY OF THE INVENTION

It is an object of this invention to provide a solder composition for joining and sealing which is less toxic than common lead-containing solders.

It is a further object of this invention to provide lead-free solder compositions with relatively low melting temperatures suited to the assembly of electronic components. As used herein, "lead-free" means that the alloy or solder does not contain lead or is essentially free of lead. As a guideline to the meaning of essentially free of lead, see Federal Specification QQ-S-571E Interim Amendment 5 (ER) 28 Dec. 1989, paragraph 3.2.1.1.1), as approved by the Commissioner, Federal Supply Service, General Services Administration (lead content shall not exceed 0.2%).

It is still further an object of this invention to provide lead-free solder compositions with relatively small melting ranges suited for use in automated soldering operations.

It is also an object of this invention to provide a lead-free solder which can replace currently used lead-containing solders such as Sn63Pb37.

In accordance with the present invention there are provided substantially lead-free solders comprising tin, zinc and indium. The above and other objects and advantages of the present invention will be apparent upon consideration of the following detailed description.

DETAILED DESCRIPTION OF THE INVENTION

Applicants have found that compositions comprising effective amounts of tin, zinc and indium are suitable for electronic soldering operations. The preferred alloys are those with melting temperatures at about or below 190° C. and with a relatively small pasty range.

In one embodiment of the invention, the composition comprises from about 72.8% to about 89.4% by weight tin, from about 6.7% to about 19.2% by weight zinc and from about 2.7% to about 16.4% by weight indium. A preferred composition is about 83.6% by weight tin, about 7.6% by weight zinc and about 8.8% by weight indium.

The alloy compositions of the present invention can be prepared by techniques well known in the art. For example, measured (by weight) amounts of tin, zinc and indium can be placed in a heating vessel. These metals can then be melted together using any conventional melting technique. When the metals have been heated to a temperature at which all the material is liquid, the mixture is stirred and allowed to cool and cast into a suitable mold. After cooling, the alloy can be fabricated into suitable shapes such as rods, wire, foil and the like.

The following examples present illustrative but non-limiting embodiments of the present invention. Unless otherwise indicated in the examples and elsewhere in the specification and claims, all parts and percentages are by weight.

EXAMPLE 1

An alloy is prepared having the following composition:

| Tin | 89.4% |
|---|---|
| Zinc | 6.9% |
| Indium | 3.7% |

The resulting alloy has a solidus temperature of 190.0° C. and a liquidus temperature of 193.0° C. The alloy has a melting range of 3.0° C.

EXAMPLE 2

An alloy is prepared having the following composition:

| Tin | 89.0% |
|---|---|
| Zinc | 8.3% |
| Indium | 2.7% |

The resulting alloy has a solidus temperature of 191.4° C. and a liquidus temperature of 192.7° C. The alloy has a melting range of 1.3° C.

EXAMPLE 3

An alloy is prepared having the following composition:

| Tin | 87.7% |
|---|---|
| Zinc | 8.0% |
| Indium | 4.3% |

The resulting alloy has a solidus temperature of 190.3° C. and a liquidus temperature of 192.2° C. The alloy has a melting range of 1.9° C.

EXAMPLE 4

An alloy is prepared having the following composition:

| Tin | 85.9% |
|---|---|
| Zinc | 6.7% |
| Indium | 7.4% |

The resulting alloy has a solidus temperature of 182.3° C. and a liquidus temperature of 188.9° C. The alloy has a melting range of 6.6° C.

EXAMPLE 5

An alloy is prepared having the following composition:

| Tin | 85.8% |
|---|---|
| Zinc | 7.7% |
| Indium | 6.5% |

The resulting alloy has a solidus temperature of 184.6° C. and a liquidus temperature of 188.4° C. The alloy has a melting range of 3.8° C.

EXAMPLE 6

An alloy is prepared having the following composition:

| Tin | 85.2% |
|---|---|
| Zinc | 6.8% |
| Indium | 8.0% |

The resulting alloy has a solidus temperature of 182.2° C. and a liquidus temperature of 188.6° C. The alloy has a melting range of 6.4° C.

EXAMPLE 7

An alloy is prepared having the following composition:

| Tin | 83.6% |
|---|---|
| Zinc | 7.6% |
| Indium | 8.8% |

The resulting alloy has a solidus temperature of 181.2° C. and a liquidus temperature of 186.9° C. The alloy has a melting range of 5.7° C.

The solderability of this alloy was examined based on dip testing at 200° C. and 240° C. Using a common flux formulation, the alloy exhibited wetting times of 1.61 seconds at 200° C. with a wetting force of 1.56 grams and 0.77 seconds at 240° C. with a wetting force of 1.59 grams. These results compare favorably with Sn63Pb37 which has wetting times of 2.01 seconds at 200° C. with a wetting force of 1.93 grams and 1.11 seconds at 240° C. with a wetting force of 1.84 grams.

EXAMPLE 8

An alloy is prepared having the following composition:

| Tin | 82.5% |
| --- | --- |
| Zinc | 13.6% |
| Indium | 3.9% |

The resulting alloy has a solidus temperature of 188.4° C. and a liquidus temperature of 192.0° C. The alloy has a melting range of 3.6° C.

EXAMPLE 9

An alloy is prepared having the following composition:

| Tin | 79.9% |
| --- | --- |
| Zinc | 7.6% |
| Indium | 12.5% |

The resulting alloy has a solidus temperature of 177.2° C. and a liquidus temperature of 182.0° C. The alloy has a melting range of 4.8° C.

EXAMPLE 10

An alloy is prepared having the following composition:

| Tin | 79.6% |
| --- | --- |
| Zinc | 12.4% |
| Indium | 8.0% |

The resulting alloy has a solidus temperature of 182.5° C. and a liquidus temperature of 186.4° C. The alloy has a melting range of 3.9° C.

EXAMPLE 11

An alloy is prepared having the following composition:

| Tin | 76.6% |
| --- | --- |
| Zinc | 7.0% |
| Indium | 16.4% |

The resulting alloy has a solidus temperature of 166.0° C. and a liquidus temperature of 176.0° C. The alloy has a melting range of 10.0° C.

EXAMPLE 12

An alloy is prepared having the following composition:

| Tin | 72.8% |
| --- | --- |
| Zinc | 19.2% |
| Indium | 8.0% |

The resulting alloy has a solidus temperature of 184.1° C. and a liquidus temperature of 186.1° C. The alloy has a melting range of 2.0° C.

Although these alloys have been described with regard to their utility for soldering of electronic components they can be used in many of the applications for which solders are used. The low melting points of these solders make them particularly useful where temperature sensitive elements are to be sealed.

While the invention has been explained in relation to its preferred embodiments, it is to be understood that various modifications thereof will become apparent to those skilled in the art. The foregoing disclosure is not intended or to be construed to limit the present invention, or to otherwise exclude any such other embodiments, adaptations, variations and equivalent arrangements, the present invention being limited only by the claims appended hereto and the equivalents thereof.

We claim:

1. An alloy comprising about 72.8% to about 89.4% by weight tin, about 6.7% to about 19.2% by weight zinc and about 2.7% to about 16.4% by weight indium.

2. The alloy of claim 1, wherein the melting range is about 10.0° C. or below.

3. The alloy of claim 2, wherein the melting range is about 6.6° C. or below.

4. The alloy of claim 1, further having a solidus temperature between about 166° C. and about 192° C. and a liquidus temperature between about 176° C. and about 193° C.

5. The alloy of claim 4, wherein the solidus temperature is between about 175° C. and about 185° C.

6. The alloy of claim 1 comprising about 83.6% by weight tin, about 7.6% by weight zinc and about 8.8% by weight indium.

7. The alloy of claim 1 comprising about 89% by weight tin, about 7% by weight zinc and about 4% by weight indium.

8. The alloy of claim 1 comprising about 89% by weight tin, about 8% by weight zinc and about 3% by weight indium.

9. The alloy of claim 1 comprising about 88% by weight tin, about 8% by weight zinc and about 4% by weight indium.

10. The alloy of claim 1 comprising about 86% by weight tin, about 7% by weight zinc and about 7% by weight indium.

11. The alloy of claim 1 comprising about 86% by weight tin, about 8% by weight zinc and about 6% by weight indium.

12. The alloy of claim 1 comprising about 85% by weight tin, about 7% by weight zinc and about 8% by weight indium.

13. The alloy of claim 1 comprising about 82% by weight tin, about 14% by weight zinc and about 4% by weight indium.

14. The alloy of claim 1 comprising about 80% by weight tin, about 8% by weight zinc and about 12% by weight indium.

15. The alloy of claim 1 comprising about 76% by weight tin, about 7% by weight zinc and about 16% by weight indium.

16. The alloy of claim 1 comprising about 73% by weight tin, about 19% by weight zinc and about 8% by weight indium.

17. A method of joining two or more surfaces which comprises applying to said surfaces a molten solder alloy comprising about 72% to about 89% by weight tin, about 7% to about 19% by weight zinc and about 3% to about 16% indium, wetting said surfaces with said solder alloy, and cooling said surfaces and solder to create a bond between said surfaces.

18. The method of claim 17 wherein the alloy comprises about 83.6% by weight tin, about 7.6% by weight zinc and about 8.8% by weight indium.

19. The method of claim 17 wherein the alloy comprises about 89% by weight tin, about 7% by weight zinc and about 4% by weight indium.

20. The method of claim 17 wherein the alloy comprises about 89% by weight tin, about 8% by weight zinc and about 3% by weight indium.

21. The method of claim 17 wherein the alloy comprises about 88% by weight tin, about 8% by weight zinc and about 4% by weight indium.

22. The method of claim 17 wherein the alloy comprises about 86% by weight tin, about 7% by weight zinc and about 7% by weight indium.

23. The method of claim 17 wherein the alloy comprises about 86% by weight tin, about 8% by weight zinc and about 6% by weight indium.

24. The method of claim 17 wherein the alloy comprises about 85% by weight tin, about 7% by weight zinc and about 8% by weight indium.

25. The method of claim 17 wherein the alloy comprises about 82% by weight tin, about 14% by weight zinc and about 4% by weight indium.

26. The method of claim 17 wherein the alloy comprises about 80% by weight tin, about 8% by weight zinc and about 12% by weight indium.

27. The method of claim 17 wherein the alloy comprises about 76% by weight tin, about 7% by weight zinc and about 16% by weight indium.

28. The method of claim 17 wherein the alloy comprises about 73% by weight tin, about 19% by weight zinc and about 8% by weight indium.

* * * * *